UNITED STATES PATENT OFFICE.

WILLIAM W. WOOD, OF TACOMA, WASHINGTON.

WATERPROOF GLUE.

1,270,477.     Specification of Letters Patent.     Patented June 25, 1918.

No Drawing.     Application filed July 25, 1917. Serial No. 182,770.

*To all whom it may concern:*

Be it known that I, WILLIAM W. WOOD, citizen of the United States, residing at Tacoma, in the county of Pierce and State of Washington, have invented a certain new and useful Waterproof Glue, of which the following is a specification.

The object of my invention is to provide a waterproof adhesive composition and a process of preparing the same, which composition shall be adapted for serving as a cement or glue which may be applied to surfaces of two objects to cause said surfaces strongly and permanently to adhere one to the other irrespective of any subsequent subjection of said objects to contact with water or moisture; and which adhesive composition shall be particularly well adapted for adhesively uniting the several layers of wood in the process of making wooden veneer.

My composition consists in a mixture of blood, silicate of soda and ammoniated water, that is, water to which is added only such small quantity of spirits of ammonia as will aid in expediting the vaporization of the volatile portions of the composition after the surfaces to which it has been applied have been joined; but such addition of spirits of ammonia is not necessary to make the composition highly efficient as waterproof adhesive composition of great strength, its only effect being to make the composition between the joined surfaces dry more quickly.

In preparing the composition I prefer to use the ingredients in about the following proportions, viz., One gallon of saturated solution of silicate of soda, Two gallons of blood, Three gallons of water, and One tenth of a fluid ounce of spirits of ammonia.

Good results may be obtained, however, when the ingredients are varied in amounts to the extent of 20 per cent.

These ingredients are thoroughly mixed in a vessel suitable for applying heat to the mixture, whereupon the mixture is subjected to a temperature of not less than 150 degrees nor more than 200 degrees, Fahrenheit, for such length of time as will cause the mixture to be of such consistency as will adapt it to be applied like glue to surfaces of objects to be joined, and thereupon the mixture is permitted to cool, after which it may be disposed in suitable airtight containers until required for use.

I am aware that adhesive mixtures have been made which contain blood, or other albuminous matter, silicates and water, but when using such mixtures, after they are applied to surfaces of objects and such surfaces are joined, then days must elapse before the applied mixture dries and hardens unless the joined objects are subjected to an abnormally higher temperature; while by my process of preparing my adhesive mixture, in the course of which my mixture is subjected to a temperature of above 150 degrees, Fahrenheit, for a long time, such defect is obviated and when surfaces are joined by my invention the mixture therebetween dries and hardens to be waterproof within twenty-four hours without applying heat to said surfaces.

What I claim is:

A process of making waterproof glue consisting of mixing together one gallon of saturated solution of silicate of soda, two gallons of blood, three gallons of water and one tenth of a fluid ounce of spirits of ammonia, the ammonia aiding in expediting the vaporization of the volatile portions from the joined objects upon which the finished product is placed, said ingredients being thoroughly mixed and subject to a heat of a temperature above 150° F. and not exceeding 200° F. which is a sufficient temperature to cause the mixture to be of such a consistency as adapted to be applied to the surfaces of objects.

In witness whereof, I hereunto subscribe my name this 20th day of July A. D., 1917.

WILLIAM W. WOOD.

Copies of this patent may be obtained for five cents each, by addressing the "Commissioner of Patents, Washington, D. C."